(12) United States Patent
Kicker

(10) Patent No.: US 8,801,483 B2
(45) Date of Patent: Aug. 12, 2014

(54) ADJUSTABLE DOUBLE BLADED WATER PADDLE

(71) Applicant: Dale Kevin Kicker, Dresser, WI (US)

(72) Inventor: Dale Kevin Kicker, Dresser, WI (US)

( * ) Notice: Subject to any disclaimer, the term of this patent is extended or adjusted under 35 U.S.C. 154(b) by 0 days.

(21) Appl. No.: 13/915,456

(22) Filed: Jun. 11, 2013

(65) Prior Publication Data

US 2013/0330190 A1    Dec. 12, 2013

Related U.S. Application Data

(60) Provisional application No. 61/689,590, filed on Jun. 11, 2012.

(51) Int. Cl.
*B63H 16/04*    (2006.01)

(52) U.S. Cl.
USPC .......................................................... 440/101

(58) Field of Classification Search
USPC ...................... 440/101; 114/221 R
See application file for complete search history.

(56) References Cited

U.S. PATENT DOCUMENTS

| | | | | |
|---|---|---|---|---|
| 4,793,646 | A | * | 12/1988 | Michaud, Jr. .................. 294/210 |
| 6,881,111 | B2 | | 4/2005 | Bridge et al. |
| 8,235,760 | B2 | * | 8/2012 | Rechner et al. ............... 440/101 |

* cited by examiner

*Primary Examiner* — Edwin Swinehart
(74) *Attorney, Agent, or Firm* — Jacobson and Johnson; Thomas N. Phung

(57) ABSTRACT

A water paddle comprising a first shaft having a blade end and a free end and a second shaft having a blade end and a free end, a first cog collar located on an exterior surface of first shaft and having a first set of teeth extending radially from a mating end of first cog collar and accessible to the user's fingers, a second cog collar located on an exterior surface of second shaft and having a second set of teeth extending radially from a mating end of second cog collar and accessible to the user's fingers, second set of teeth mateable with first set of teeth to prevent rotational movement between shafts, a ferrule extending from the free end of second shaft, a clip lip member located on an interior surface of the ferrule, and a spring tab mechanism located within an interior surface of first shaft and includes a body having corresponding resilient arms each having a displaceable tab supported thereon engageable with a set of push button holes located on first shaft.

17 Claims, 3 Drawing Sheets

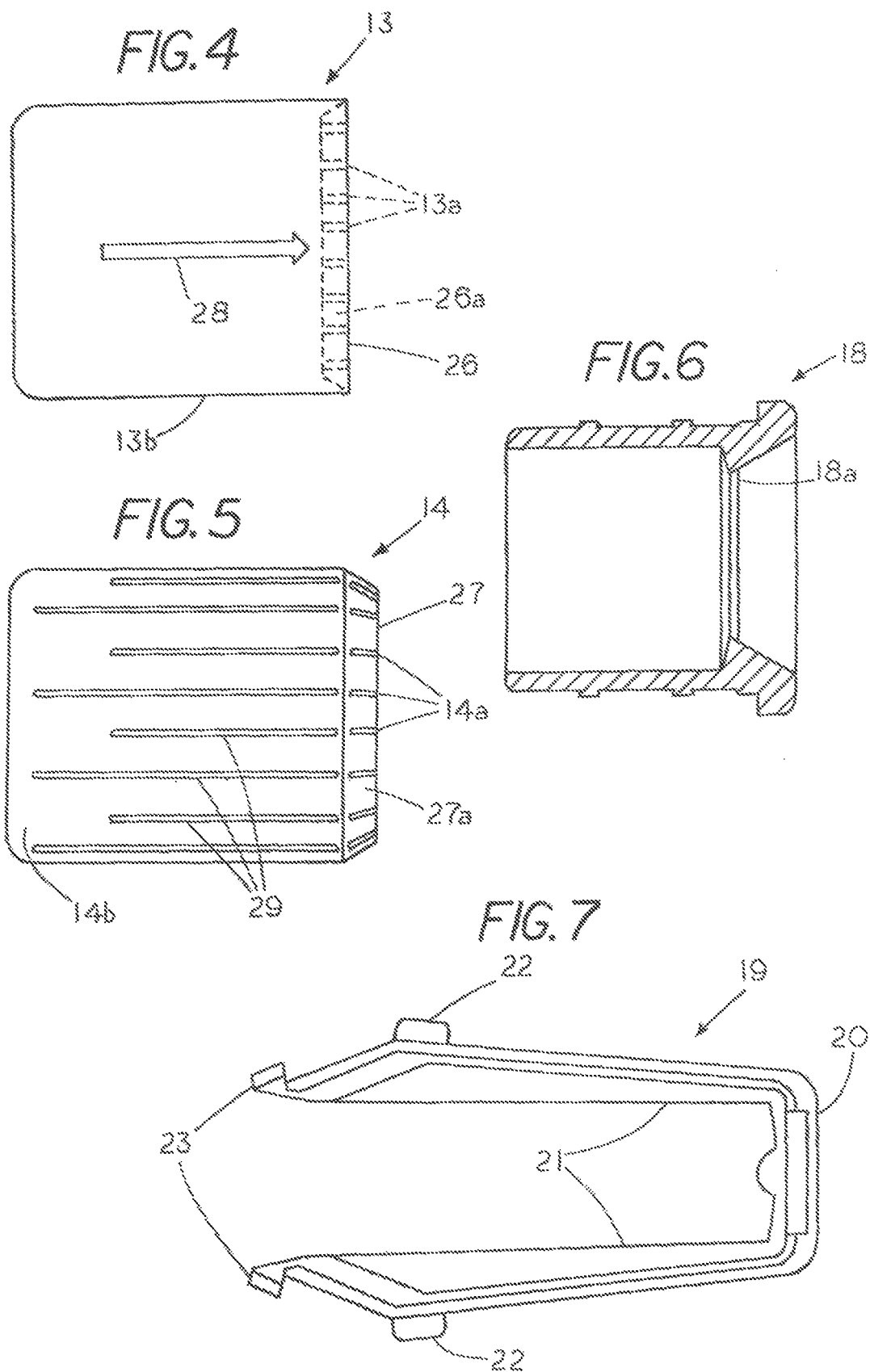

ADJUSTABLE DOUBLE BLADED WATER PADDLE

FIELD OF THE INVENTION

This invention relates generally to water paddle and, more specifically to an adjustable double bladed water paddle that allows for the angularly positioning of a pair of opposing paddle blades relative to each other about a paddle axis.

CROSS REFERENCE TO RELATED APPLICATIONS

This application claims priority to currently pending U.S. Provisional Application Ser. No. 61/689,590; filed Jun. 11, 2012; titled WATER PADDLE COUPLER.

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of double-bladed paddles are well known in the held of recreational water sports and more specifically to non-motorized watercrafts such as canoes and kayaks in order to allow users to optimize the performance of their watercrafts. Double-bladed paddles preferably have blades with planes that are offset from each other by an angle between 45 and 90 degrees, a term generally defined as being feathered. Feathering of the blades function to allow each of the blades to cut cleanly through the air during the forward stroke leading to minimum windage thereby alleviating some of the stress on the user's wrist resulting from the windage.

One of the problems associated with using feathered double-bladed paddles is that they may take some getting used to since a user's paddling style may differ due to the specific user's body type and comfort level. Since a user's paddling style generally differs from user to user, using a double-bladed paddle that is feathered to a fixed blade angle, which the user is not comfortable with may lead to possible wrist injuries due to the repetitive stress on the user's wrist resulting from the uncomfortable fixed feathered angle of the blades.

Double-bladed water paddle that allow for the custom angularly positioning or custom feather of the blades are known in the art but have numerous deficiencies. For example, U.S. Pat. No. 6,881,111 to Bridge et al. discloses a paddle shaft coupling system comprising a first shaft having protrusions located at the oppose end of a paddle blade. The protrusions are inserted into an interior of a second shaft until the protrusions are extended into receptacles, which are located completely within the second shaft. One of the problems associated with U.S. Pat. No. 6,881,111 is that since the protrusions mate with the receptacles inside the second shaft, obstructions that may hinder and/or prevent the mating or engagement of the protrusions and receptacles are not only difficult to detect but also difficult to remove from inside of the shaft and may require special tools to assist in their removal. The aforementioned is especially problematic if the water paddle is used around sandy beaches where grains of sand may often time get into the paddle shafts.

Another problem associated the water paddle disclosed in U.S. Pat. No. 6,881,111 is that since it provides for a one-button disconnection system, accidental bumps on the release button by a user during usage of the water paddle may result in accidental disconnection of the paddle shafts leading to safety concerns to the user.

BRIEF SUMMARY OF THE INVENTION

The present invention comprises an adjustable double bladed water paddle that allows for the angularly positioning of a pair of opposing paddle blades relative to each other about a paddle axis. The water paddle coupler includes a first paddle shaft having a paddle blade end and a free end and a second paddle shaft having a blade end and a free end.

Located on an exterior surface of the first paddle shaft proximal the free end of the first paddle shaft is a first cog collar having a plurality of teeth extending radially from a mating end of the first cog collar proximal the free end of the first shaft and accessible to the user's fingers.

Located on an exterior surface of the second paddle shaft proximal the free end of the second paddle shaft is a second cog collar having a plurality of teeth extending radially from a mating end of the second cog collar proximal the free end of the second shaft and accessible to the user's fingers, the second set of teeth mateable with the first set of teeth to prevent rotational movement between the paddle shafts.

The water paddle includes a ferrule extending from the free end of the second paddle shaft, the ferrule having a free end with the second collar located between the paddle blade and the free end of the ferrule. The ferrule includes a clip lip member located on an interior surface of the ferrule proximal the free end of the ferrule.

The water paddle coupler also includes a spring tab mechanism located within an interior surface of the first paddle shaft and spaced downstream from the first cog collar, the spring tab having a body that includes a set of corresponding resilient arms each having a displaceable tab supported thereon for engagement with a set of push button holes located on the first paddle shaft to provide positive connection confirmation and prevent linear movement between the paddle shafts while providing for a dual-button release system. Each of the resilient arms having a catch member for engagement with the clip lip member to lockingly secure the first paddle shaft to the second paddle shaft to further prevent linear movement between the paddle shafts.

BRIEF DESCRIPTION OF THE DRAWINGS

FIG. 4 shows a top view of a first cog collar of the adjustable double bladed water paddle of FIGS. 1 and 3.

FIG. 5 shows a top view of a second cog collar of the adjustable double bladed water paddle of FIGS. 1 and 3.

FIG. 6 is a cross-section view of a clip lip member of the of adjustable double bladed water paddle of FIGS. 1 and 3;

FIG. 7 is a side view showing a spring tab mechanism of the adjustable double bladed water paddle of FIGS. 1 and 3;

DESCRIPTION OF THE PREFERRED EMBODIMENT

Figure 1:
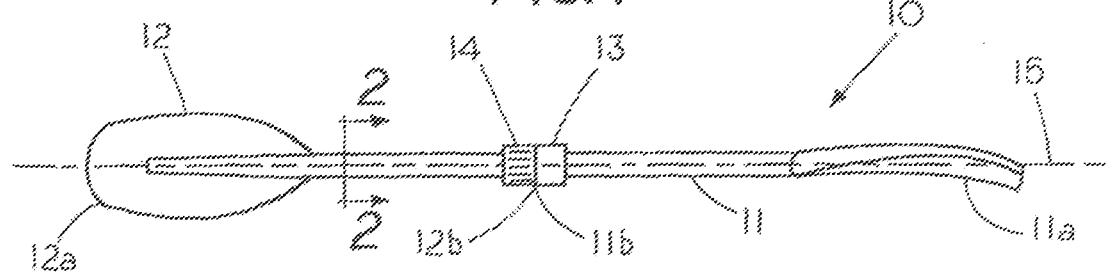
FIG. 1 is a perspective view showing an adjustable double bladed water paddle.

FIG. 1 is a perspective view showing an adjustable double bladed water paddle 10 of the present invention. Adjustable double bladed water paddle 10 generally comprises a first paddle shaft 11 having a paddle blade end 11*a* and a free end 11*b* and a second paddle shaft 12 having a blade end 12*a* and a free end 12*b*. First paddle shaft 11 and second paddle shaft 12 are shown connected to each other by a first cog collar 13 and a second cog collar 14. A feature of adjustable double bladed water paddle 10 is that cog collars 13 and 14 function to allow for the angularly positioning of first paddle shaft 11 and second paddle shaft 12 relative to each other about a paddle axis 15.

Figure 2:
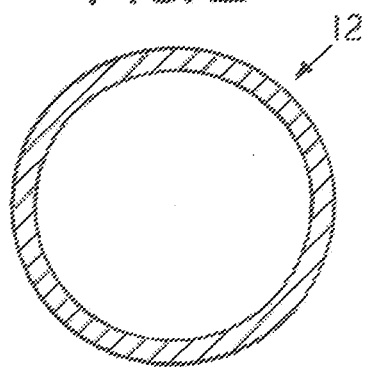
FIG. 2 shows a cross-sectional view of adjustable double bladed water paddle of FIG. 1 taken along the lines 2-2.
Figure 2A:
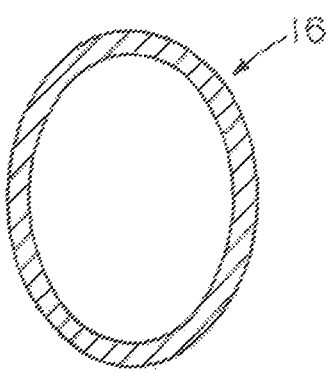
FIG. 2A shows a cross-sectional view of an alternative embodiment of an adjustable double bladed water paddle coupler having an oval shaped cross-section.

FIG. 2 is a cross-sectional view showing adjustable double bladed water paddle 10 taken along the lines 2-2 which shows shaft 12 comprising a circular shaped cross-section. FIG. 2A shows a cross-sectional view of an alternative embodiment of an adjustable double bladed water paddle coupler 16 having an oval shaped cross-section, which may offer a more comfortable grip than the traditional round shape.

Referring to FIGS. 3, 4, 5, 6, and 7, FIG. 3 shows an exploded, perspective view of the coupling components of adjustable double bladed water paddle 10, which functions to allow for the angularly positioning of a first paddle shaft 11 and a second paddle shaft 12 and in turn the angular positioning of blade ends 11*a* and 11*b*, relative to each other about a paddle axis 15 (shown in FIG. 1).

Figure 3:
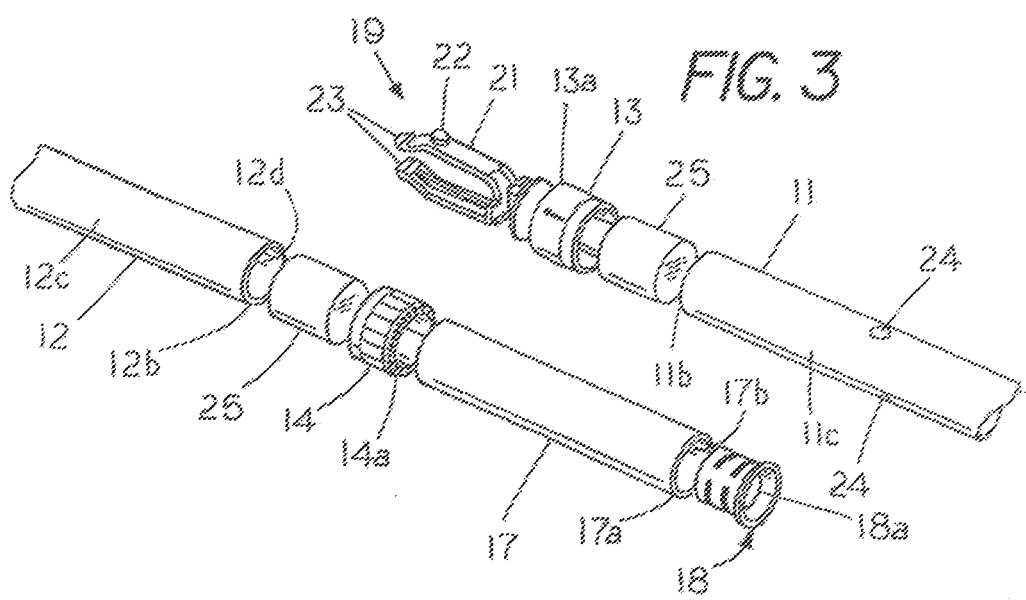
FIG. 3 shows an exploded, perspective view of the coupling components of the adjustable double bladed water paddle of FIG. 1.

FIGS. 4 and 5 are each top views showing cog collars 13 and 14 of the adjustable double bladed water paddle 10 of FIGS. 1 and 3. FIG. 6 as a cross-section view of a clip lip member of the adjustable double bladed water paddle 10. FIG. 7 is a side view of showing a spring tab mechanism of adjustable double bladed water paddle 10.

As shown in the embodiment of FIG. 3 the coupling components of adjustable double bladed water paddle 10 generally comprise cog collar 13 located on at exterior surface 11*c* of first paddle shaft 11 proximal the free end 11*b* of the first paddle shaft 11. Second paddle shaft 12 includes cog collar 14 located on an exterior surface 12*c* of the second paddle shaft 12 proximal the free end 12*b* of the second paddle shaft 12. The cog collars 13 and 14 may be fixedly secured to the respective paddle shafts 11 and 12 by a plurality of means including but not limited to the use of various types of adhesive, heat bonded thereto, and being pre-molded thereto.

The cog collars 13 and 14 are similar to each other in size and shape with cog collar 13 including a plurality of teeth 13*a* (shown in FIGS. 4 and 5) which in the embodiment of FIGS. 1 and 3 are shaped and sized to form a fitted engagement with a plurality of teeth 14*a* of cog collar 14 wherein the mating engagement of the teeth 13*a*, 14*a* of the cog collars 13 and 14 prevent rotation of second paddle shaft 12 relative to first paddle shaft 11 along paddle axis 15 formed by connection of paddle shafts 11 and 12. The mating between first set of teeth and second of set teeth 14*a* also forms a gap-free water sealing engagement between the cog collars 13 and 14 while preventing free play or wiggle movement between paddle shafts 11 and 12 while in the use condition. In the embodiment of FIGS. 3, 4, and 5, first and second set of teeth 13*a* and 14*a* may also include the feature of being tapered to provide for a guiding engagement for a quick and accurate connection between the cog collars 13 and 14.

A feature of the present invention is that due to their location on paddle shafts 11 and 12 teeth 13*a*, 14*a* of cog collars 13 and 14 are readily and easily accessible to the users fingers to allow the user not only visually detect obstructions therein or therebetween but to also allow the user to easily clear the teeth of obstructions that may hinder their mating or engagement without the need for tools. This feature is particularly advantageous when adjustable double bladed water paddle 10 is used around sandy beaches where grains of sand may often times get stuck between the teeth 13*a*, 14*a* of the cog collars 13 and 14. It is noted that in alternative embodiments of the present invention, the plurality of teeth of the cog collars may be positioned on shear plane instead of vertical plane to the shaft.

Referring to FIGS. 4 and 5, first cog collar 13 includes a sleeve 26 extending from an end of first cog collar 13 with an interior surface 26*a* of the sleeve connecting to the first set of teeth 13*a* to provide structural support to the first set of teeth 13*a*. Second cog collar 14 includes a tapering skirt 27 extending from an end of the second cog collar 14 with an exterior surface 27*a* of the tapering skirt 27 connecting to the second set of teeth 14*a* to provide structural support to the second set of teeth 14.

First cog collar 13 also includes a dial indicating rib 28 extending from an exterior surface 13*b* of first cog collar 13 and second cog collar 14 includes a set of ribs 29 radially positioned on and extending from an exterior surface 14*b* of the second cog collar 14 to provide for a visual and touch-feel indicator markings. It is noted that each of the ribs 29 of second cog collar 14 may be separated radially at least 5 degrees and preferable 15 degrees from each other for user reference purposes.

The coupling components also include a ferrule 17 that is partially supported within an interior surface 12*d* of paddle shaft 12 and functions to link second paddle shaft 12 to first paddle shaft 11. Ferrule 17 includes a free end 17*a* that extends from the free end 12*b* of second paddle shaft 12 with cog collar 14 positioned between, paddle blade 12*a* and toe free end 17*a* of ferrule 17. The portion of ferrule 1.7 that extends from the bee cud 12*b* of second paddle shaft 12, in use, is supported within an interior surface of paddle shaft 11.

Ferrule 17 includes a clip lip member located on an interior surface 17*b* of ferrule 17 proximal the tree end 17*a*. In the embodiment of FIG. 3 the clip lip member comprises a bushing 18 having a clip lip 18*a*, which is more clearly shown in FIG. 6. Bushing 18 may be fixedly secured to the first end 17*a* of ferrule 17 by a plurality of means including but not limited to the use of various types of adhesive, heat bonded thereto, and being pre-molded thereto. It is noted that in alternative embodiments of the present invention, the bushing may comprise a two parts assembly having for example male and female threads to allow for adjustability as ferule parts tend to wear out over prolong use.

Referring to FIG. 7, the coupling components also include a spring tab mechanism 19 for engagement with clip lip 18*a* (see FIGS. 3 and 6) to lockingly secure the connection between paddle shafts 11 and 12. More specifically, in the preferred embodiment spring tab mechanism 19 is located within an interior surface of the first paddle shaft 11 and spaced downstream from the first cog collar 13. That is, embodiment spring tab mechanism 19 is not a part of cog collar 13.

Spring tab mechanism 19 generally comprising a body 20 that includes a set of corresponding resilient arms 21 each having a pushable or displaceable push tab 22 supported thereon. Each of the corresponding resilient arms 21 also includes a catch member 23 for engagement with clip lip 18a to lockingly secure the first paddle shaft 11 to second paddle shaft 12 and prevent linear movement between the paddle shafts 11 and 12. Spring tab mechanism 19 is supported within an interior surface of first paddle shaft 11 in a condition in which push tabs 22 are extendable through a set of corresponding push button holes 24 that are located on first paddle shaft 11 to provide positive visual connection confirmation and prevent linear and axial movement between paddle shafts 11 and 12 while providing a dual-button release system.

The dual-button release system not only helps to lock the ferrule 17 securely to first shaft 11 but also provides an added safety feature by requiring the user as depress both push tabs 22 to disengage the locking of ferrule 17 from first shaft 11. That is, accidentally hitting one of the push tabs 22 on adjustable double bladed water paddle 10 will not disengage ferrule 17 from first shaft 11.

Spring tab mechanism 19 alone also eliminates the need for any other type of biasing means to hold the shafts 11 and 12 together while providing increase convenience in the transport and storage of adjustable double bladed water paddle 10 by allowing for the reduction of the length of adjustable double bladed water paddle 10 while in the transport and/or storage condition.

Another feature of spring tab mechanism 19 is that when the catch member 23 lockingly engages with clip lip 18a and displaceable tabs 22 engages their corresponding push button holes 24, the force resulting from the mating engagement between catch member 23 and clip lip 18a provides for an auditory indicator of positive locking connection confirmation between the paddle shafts.

The features of the positive visual connection confirmation and the auditory indicator of positive locking connection confirmation between the paddle shafts 11 and 12 resulting from the engagement between catch member 23 and clip lip 18a helps to reduce possible injuries and safety concerns to the user resulting from an accidental disconnection of the paddle shafts 11 and 12 due to improper or incomplete connection of the paddle shafts 11 and 12.

Although in alternative embodiments the spring tab mechanism may be formed from a variety of materials and comprise a plurality of parts, spring tab mechanism 19 of FIG. 7 preferably comprises a one-piece member form entirely of plastic to help eliminate corrosion especially if adjustable double bladed water paddle 10 is used for salt water kayaking or the like.

In alternative embodiments of the present invention, spring tab mechanism 19 may also compose an opposing leaf spring concept, which would allow the pushable or displaceable tab or buttons to move perpendicular to paddle shaft. FIG. 3 also shows an optional foam plug 25 that may be place in paddle shafts 11 and 12 to prevent or limit fluids from being collected in paddle shafts 11 and 12.

Figure 8:
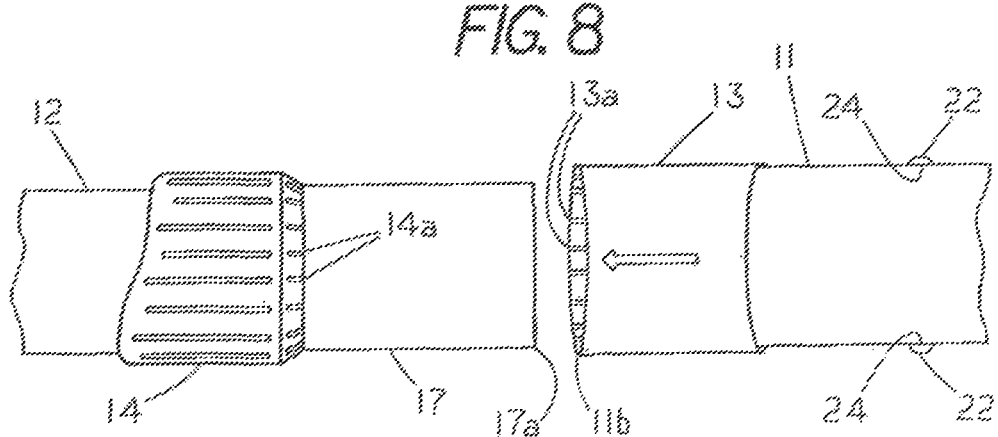
FIG. 8 shows a close-up perspective view of the first end of a ferrule aligned with a free end of the first paddle shaft.
Figure 9:
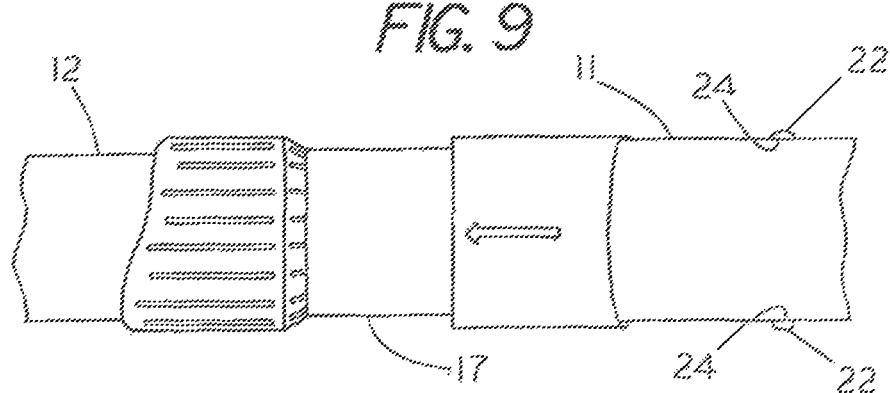
FIG. 9 shows a close-up perspective view of the first end of the ferrule being slid into the free end of first paddle shaft.
Figure 10:
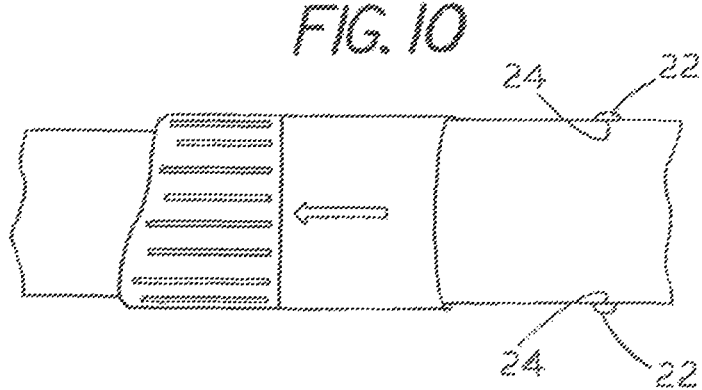
FIG. 10 shows a close-up perspective view of the free end of the first paddle shaft being brought towards the free end of the second paddle shaft to obtain positive visual and auditory locking connection confirmation.

FIGS. 8, 9, and 10 show close-up perspective views of the steps of forming a one-piece double-bladed paddle 10 from first paddle shaft 11 and paddle shaft 12. In forming a one-piece double-bladed paddle 10 from first paddle shaft 11 and paddle shaft 12, first end 17a of ferrule 17 is initially aligned with the free end 11b of first paddle shaft 11 as shown in FIG. 8. The first end 17a of ferrule 17 is then slid into the free end 11b of first paddle shaft 11 as shown in FIG. 9 until the clip lip 18a of bushing 18 comes into contact with spring tab mechanism 19 (shown in FIGS. 3 and 7).

Paddle shafts 11 and 12 are then angularly positioned at a desired position relative to each other after which the set of catch 22 of spring tab mechanism 19 are extended into the interior of the bushing 18 passing the clip lip 18a of the bushing 18 and leading to the engagement of the plurality of teeth 13a of cog collar 13 with the plurality of teeth 14a of cog collar 14 as shown in FIG. 10.

Extending the set of catch 22 of spring tab mechanism 19 pass the clip lip 18a of the bushing 18 also leads to the extension of push tabs 22 of spring tab mechanism 19 through the push button holes 24 located on first paddle shaft 11 which functions to secure the connection of paddle shafts 11 to paddle shaft 12 as the engagement of the set of catch 22 with clip lip 18a of the bushing 18 will also assist in preventing paddle shaft 11 from being disconnected with paddle shaft 12. The engagement of the plurality of teeth 13a of cog collar 13 with the plurality of teeth 14a of cog collar 14 prevents further angularly positioning or rotational movement of paddle shafts 11 and 12 with respect to each other.

To displace of first paddle shafts 11 with respect to second paddle shaft 12, a user depresses both push tabs 22 sufficiently through the push button holes 24 of first paddle shaft 11 to displace the engagement of the set of catch 22 with clip lip 18a. The user then applies sufficient opposing forces on the paddle shaft 11 and paddle shaft 12 to disengage the plurality of teeth 8 of cog collar 13 with the plurality of teeth 14a of cog collar 14 and allowing for separation first paddle shaft 11 with respect to second paddle shaft 12.

The present invention also includes a method of forming an adjustable double bladed water paddle 10 comprising the steps of (1) inserting a tree end 17a of a ferrule 17 of a second paddle shaft 12 into an interior of first paddle shaft 11; (2) bringing the free end 17a of the ferrule 17 into contact with a spring tab mechanism 19 located within an interior surface of the first paddle shaft 11 and spaced down stream from a first cog collar 13 and then rotating the first paddle shaft 11 with respect to the second paddle shaft 12 to obtain a desired water paddle feathered position; (3) locking the first paddle shaft 11 to the second paddle shaft 12 to maintain the desired water paddle feathered position by bringing a free end 11b of the first paddle shaft 11 further towards a tree end 12b of the second paddle shaft 12 until the user hears an auditory indicator of positive locking connection confirmation.

The above method may also include the step of (4) bringing the free end 11b of the first paddle shaft 11 further towards the free end 12b of the second paddle shaft 12 until the user sees positive visual locking connection confirmation identified by an engagement of a set of displaceable tabs 22 of a spring tab mechanism 10 with a set of push button holes 24 located on the first paddle shaft 11.

I claim:

1. An adjustable double bladed water paddle comprising:
   a first paddle shaft having a paddle blade end and a free end and a second paddle shaft having a blade end and a free end;
   a first cog collar located on an exterior surface of the first paddle shaft proximal the free end of the first paddle shaft, the first cog collar having a first set of teeth extending radially from a mating end of the first cog collar proximal the free end of said first shaft and accessible to the user's fingers;
   a second cog collar located on an exterior surface of the second paddle shaft proximal the free end of the second paddle shaft, the second cog collar having a second set of teeth extending radially from a mating end of the second cog collar proximal the free end of said second shaft and accessible to the user's fingers, the second set of teeth mateable with the first set of teeth to prevent rotational movement between said paddle shafts;

a ferrule extending from the free end of the second paddle shaft, the ferrule having a free end with the second collar located between the paddle blade and the free end of the ferrule;

a clip lip member located on an interior surface of the ferrule proximal the free end of the ferrule; and a spring tab mechanism located within an interior surface of the first paddle shaft and spaced downstream from the first cog collar, the spring tab mechanism having a body that includes a set of corresponding resilient arms each having a displaceable tab supported thereon for engagement with a set of push button holes located on the first paddle shaft to provide positive connection confirmation and prevent linear movement between said paddle shafts while providing for a dual-button release system, each resilient arm having a catch member for engagement with the clip lip member to lockingly secure the first paddle shaft with the second paddle shaft to further prevent linear movement between said paddle shafts.

2. The water paddle of claim 1 wherein the first cog collar includes a sleeve extending from an end of the first cog collar with an interior surface of the sleeve connecting to the first set of teeth to provide structural support to the first set of teeth.

3. The water paddle of claim 1 wherein the second cog collar includes a tapering skirt extending from an end of the second cog collar with an exterior surface of the tapering skirt connecting to the second set of teeth to provide structural support to the second set of teeth.

4. The water paddle of claim 1 wherein the mating between the first set of teeth and the second of set teeth forms a gap free water sealing engagement between the cog collars while preventing wiggle movement between said paddle shafts.

5. The water paddle of claim 1 wherein the first cog collar includes a dial indicating rib extending from an exterior surface of the first cog collar and the second cog collar includes a set of ribs radially positioned on and extending from an exterior surface of the second cog collar to provide for a visual and touch-feel indicator markings.

6. The water paddle of claim 5 wherein each of the ribs are separated radially at least 5 degrees from each other.

7. The water paddle of claim 1 wherein the spring tab mechanism comprises a one-piece member form entirely of plastic.

8. The water paddle of claim 1 wherein each of the shafts comprises an oval shaped body.

9. The water paddle of claim 1 wherein the spring tab mechanism provides for an auditory indicator of positive locking connection confirmation between the paddle shafts when the catch member locking engages with the clip lip and the displaceable tabs engages their corresponding push button holes.

10. The water paddle of claim 1 wherein the first set of teeth and the second set of teeth are all tapered to provide for a guiding engagement to provide for a quick and accurate connection between the cog collars.

11. An adjustable double bladed water paddle comprising:

a first paddle shaft having a paddle blade end and a free end and a second paddle shaft having a blade end and a free end;

a first cog collar located on an exterior surface of the first paddle shaft proximal the free end of the first paddle shaft, the first cog collar having a sleeve extending from an end of the first cog collar;

a first set of teeth located circumferentially on an interior surface of the sleeve end accessible to the user's fingers, a second cog collar located on an exterior surface of the second paddle shaft proximal the free end of the second paddle shaft, the second cog collar having a tapering end;

a second set of teeth located circumferentially on an exterior surface of the tampering end of the second cog collar and accessible to the user's fingers, the second set of teeth mateable with the first of set teeth of the first cog collar to prevent rotational movement between said paddle shafts;

a ferrule extending from the free end of the second paddle shaft, the ferrule having a free end with the second cog collar located between the paddle blade and the free end of the ferrule;

a clip lip member located on an interior surface of the ferrule proximal the free end of the ferrule; and a spring tab mechanism located within an interior surface of the first paddle shaft and spaced downstream from the first cog collar, the spring tab mechanism having a body that includes a set of corresponding resilient arms each having a displaceable tab supported thereon for engagement with a set of push button holes located on the first paddle shaft to provide positive visual connection confirmation and prevent linear movement between said paddle shafts while providing for a dual-button release system, each resilient arm having a catch member for engagement with the clip lip member to lockingly secure the first paddle shaft with the second paddle shaft to further prevent linear movement between said paddle shafts.

12. The water paddle of claim 11 wherein the mating between the first set of teeth and the second of set teeth forms a gap free water sealing engagement while preventing wiggle movement between said paddle shafts.

13. The water paddle of claim 12 wherein the first cog collar includes a dial indicating rib extending from exterior surface of said first cog collar and the second cog collar includes a set of ribs radially positioned on and extending from an exterior surface of said first cog collar to provide for a visual and touch-feel indicator markings.

14. The water paddle of claim 13 wherein each of the ribs is separated radially at least 5 degrees from each other.

15. The water paddle of claim 14 wherein the spring tab mechanism comprises a one-piece member form entirely of plastic.

16. The water paddle of claim 15 wherein the spring tab mechanism provides for an auditory indicator of positive locking connection confirmation between the paddle shafts when the catch member locking engages with the clip lip and the displaceable tabs engages their corresponding push button holes.

17. The water paddle of claim 16 wherein the first set of teeth and the second set of teeth are all tapered to provide for a guiding engagement in provide for a quick and accurate connection between the cog collars.

* * * * *